United States Patent [19]

Riquart et al.

[11] Patent Number: 4,614,381
[45] Date of Patent: Sep. 30, 1986

[54] BRAKE-PRESSURE CORRECTOR SENSITIVE TO DECELERATION

[75] Inventors: Christian Riquart, Paris; Jean-Paul Sauvée, Aubervilliers, both of France

[73] Assignee: Societe Anonyme D.B.A., Paris, France

[21] Appl. No.: 612,941

[22] Filed: May 21, 1984

[51] Int. Cl.⁴ .............................................. B60T 8/00
[52] U.S. Cl. .............................. 303/24 A; 303/24 C
[58] Field of Search ............... 303/24 C, 24 F, 24 A, 303/24 R, 6 C; 60/574, 591; 188/349

[56] References Cited

U.S. PATENT DOCUMENTS

| 2,241,191 | 5/1941 | Freeman | 303/24 F X |
| 2,242,297 | 5/1941 | Freeman | 188/152 |
| 3,147,045 | 9/1964 | Stelzer | 303/24 F |
| 3,360,004 | 12/1967 | Lewis et al. | 303/24 F X |
| 3,383,139 | 5/1968 | Chevreux | 303/24 A |
| 4,165,905 | 8/1979 | Morimoto | 303/24 C X |
| 4,175,791 | 11/1979 | Nogami | 303/24 A |

FOREIGN PATENT DOCUMENTS

| 2719109 | 11/1978 | Fed. Rep. of Germany | 303/24 C |
| 2841849 | 4/1979 | Fed. Rep. of Germany | 303/24 C |
| 0004444 | 1/1982 | Japan | 303/24 C |
| 1079508 | 8/1967 | United Kingdom | . |
| 2006361 | 5/1979 | United Kingdom | . |
| 2101248 | 12/1983 | United Kingdom | . |

Primary Examiner—Bruce H. Stoner, Jr.
Assistant Examiner—Robert J. Oberleitner
Attorney, Agent, or Firm—Larry J. Palguta; Ken C. Decker

[57] ABSTRACT

The inertial brake corrector comprises a body (1) closed by a cover (7), with a stepped piston (10) incorporating a tubular extension part (13) extending in a direction opposite the outlet chamber (20) and interacting on the inside by sliding in a leak-proof manner with a central projection of reduced diameter (14) of the cover (7), which extends in the body and which delimits, together with the tubular extension part of the piston, an inlet chamber (21) in which is located an inertial shut-off member (24), of which the retention and guide structure forming a slope (27") is advantageously fixed to the stepped piston (10).

7 Claims, 3 Drawing Figures

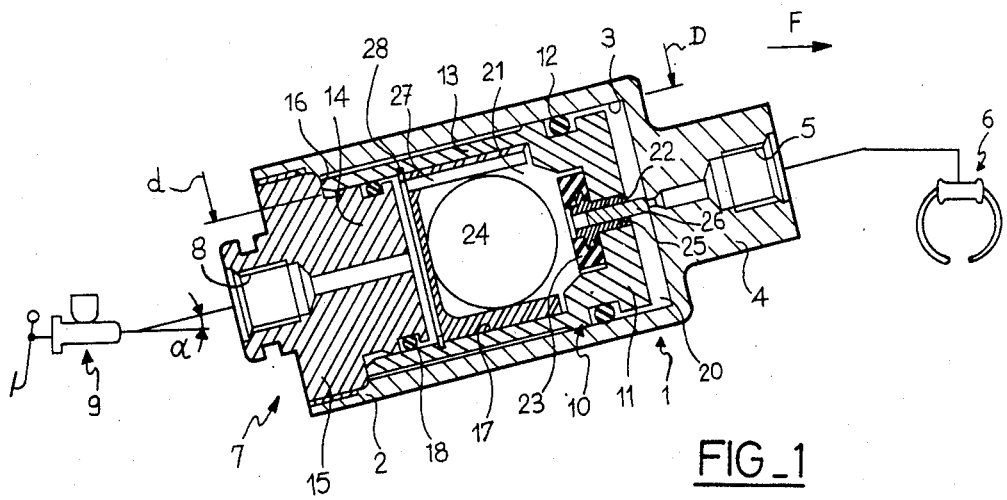
FIG_1
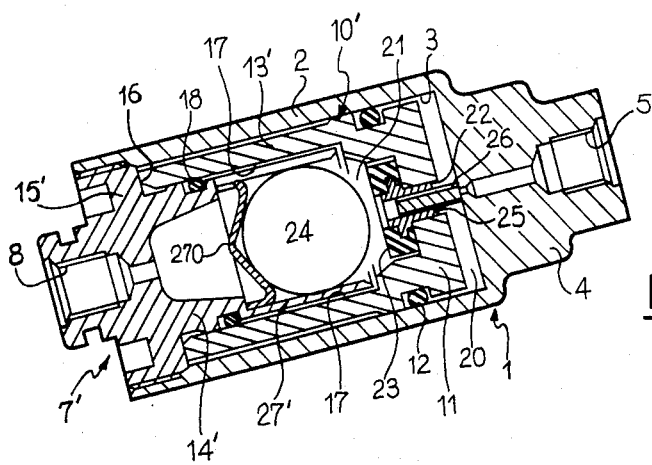
FIG_2
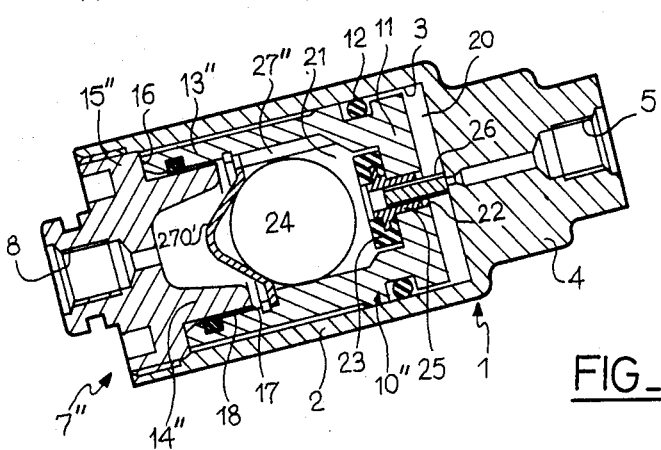
FIG_3

BRAKE-PRESSURE CORRECTOR SENSITIVE TO DECELERATION

The present invention relates to brake-pressure correctors sensitive to deceleration, for the hydraulic brake systems of vehicles, and more particularly to a brake-pressure corrector of the type comprising a housing body in which is located a stepped piston which has a first active part of small surface, associated with an inlet chamber formed in the body and intended to be connected to a brake-pressure emitter, and a second active part of large surface, associated with an outlet chamber formed in the body and intended to be connected to at least one brake motor, the two chambers being connected to one another by a passage formed coaxially in the piston and provided, on the same side as the inlet chamber, with a seat for an inertial shut-off member located in the body.

A corrector of this type is described, for example, in the documents U.S. Pat. No. 2,242,297 and G.B.-A-No. 1,079,508 and is designed to transmit to the brake motor a pressure which is normally proportional to the inlet pressure supplied by the brake-pressure emitter, but can be modified according to the deceleration conditions of the vehicle, the inertial shut-off member being liable to come up against its seat under these particular deceleration conditions, typically by moving along a slope formed by guide means incorporated in the corrector body, the latter being positioned in the vehicle at a specific angle relative to the horizontal.

In known corrector arrangements, the stepped piston interacts by sliding, by means of its peripheral surfaces of different diameters, with bores, likewise of different diameters, in the body or in an element fixed in the latter, thus stipulating a minimum longitudinal dimension for the corrector. On the other hand, in the correctors of the documents mentioned above, the body is closed in the direction of the outlet chamber of largest diameter by means of a cover which requires suitable leak-proofing means for it to be assembled on the body.

The object of the present invention is to propose a brake-pressure corrector of the type mentioned above, which allows a more compact arrangement, with a set of pistons having reduced inertia, and which makes it possible to eliminate the leak-proof junction between the cover and the housing body of the corrector.

For this purpose, according to one characteristic of the present invention, the inlet chamber is partially defined by a cover mounted in the housing body, the step piston incorporating a tubular extension part extending in the opposite direction to the outlet chamber and interacting on the inside by sliding in a leak-proof manner with a central projection of reduced diameter of the cover, which extends in the housing body and which defines, together with the tubular extension part of the piston, the inlet chamber of the corrector.

According to another characteristic of the invention, the corrector incorporates a stop element located in the passage of the piston to release the inertial member from its seat beyond a specific stroke of the piston in the direction taking it away from the cover, the stop element advantageously consisting of a perforated tube mounted to slide freely in the passage and normally bearing, at its end opposite the inertial member, against the bottom of the outlet chamber formed in the housing body of the corrector.

Other characteristics and advantages of the present invention will emerge from the following description of embodiments given in an illustrative, but non-limiting way, the description being made with reference to the attached drawings in which:

FIG. 1 shows diagrammatically, in a longitudinal section, the first embodiment of a corrector according to the invention; and FIGS. 2 and 3 show, likewise in longitudinal section, second and third embodiments of a corrector according to the invention.

In the following description and in the drawings, identical or similar elements bear the same reference numerals, with indices where appropriate.

As shown in the drawings, a brake-pressure corrector according to the invention comprises a body 1 of general tubular shape, which has a main part 2 formed with a bore 3 and an axial extension of reduced diameter 4 provided with a means 5 for connecting the inner cavity defined by the bore 3 to a vehicle wheel brake motor 6. The end of the bore 3 opposite the extension 4 is provided with a thread to receive the threaded periphery of a corrector cover, which is designated as a whole by reference numeral 7 and which is provided with a means 8 for connecting the inner cavity of the body 1, defined by the bore 3, to a brake-pressure emitter 9, typically the secondary chamber of a double master-cylinder. The arrow F indicates the forward direction of the vehicle.

The corrector comprises a stepped piston, designated as a whole by reference numeral 10, which has a piston-body part 11 mounted to slide in a leak-proof manner in the bore 3 by means of an annular gasket 12 received in a peripheral groove of the body part 11, and a tubular extension part 13 of reduced outside diameter, which, when assembled, extends axially in the opposite direction to the extension 4 of the body 1. The cover 7, 7', 7" has a tubular central projection 14, 14', 14" of an outside diameter less than the threaded outside diameter of the cover body 15, 15', 15", being connected to the latter by a radial shoulder 16. The tubular extension part 13, 13', 13" of the stepped piston 10, 10', 10" is formed with a bore 17, and its axial dimensions are such that it interacts permanently, by sliding in a leak-proof manner, with the periphery of the central projection 14 of the cover 7 by means of an annular gasket 18 located in a groove which is either formed in the central projection 14 in the vicinity of the axial end (FIGS. 1 and 2) or formed in the extension 13 in the vicinity of its end (FIG. 3).

As may be seen in FIG. 1, when assembled the piston body 11 thus defined, in the bottom of the cavity within the housing body 1 formed by the bore 3, an outlet chamber 20 which communicates permanently with the outlet connection means 5, the stepped piston 10 having, in this outlet chamber 20, an active surface of large diameter D corresponding to the diameter of the bore 3. At the opposite end, the central projection 14 of the cover 7 and the tubular extension part 13 of the stepped piston 10 define, within the latter, an inlet chamber 21 which communicates permanently via the passage in the cover 7 with the inlet connection means 8, the stepped piston having, in this inlet chamber 21, an active surface of small diameter d corresponding to the diameter of the bore 17. The two chambers 20 and 21 communicate with one another by means of a central axial passage 22 extending through the piston-body part 11. Round the end of the passage 22 opening into the inlet chamber 21

(that is to say, into the bore 17) there is a ring 23 made of an elastomeric material, which forms a seat for an inertial shut-off member 24 consisting typically of a heavy ball located in the inlet chamber 21 and normally kept away from the seat 23 under the effect of its own weight, the corrector being typically installed in the vehicle so that its longitudinal axis forms a specific angle α with the horizontal. The ring forming a seat 23 is advantageously moulded over a tubular insert 25 fitted into the passage 22.

According to one characteristic of the invention, a stop element 26 is mounted so as to slide freely in the insert 25 and consists of a split tube fastened in the housing body or, more simply, designed to bear by means of its end opposite the seat 23 against the bottom wall of the outlet chamber 20 in the region where the connection means 5 opens into this outlet chamber 20. In this way, if the inertial member 24 is seated against its seat 23 and if the control pressure in the inlet chamber 21 exceeds such a level that the stepped piston 10 is displaced beyond a specific stroke, that is to say comes up against the bottom of the outlet chamber 20, the inertial member 24 is released from its seat 23 by means of the tubular stop element 26, so as to restore communication between the inlet and outlet chambers, for example to preserve in the brake motor 6 a rising pressure proportional to that of the inlet pressure or to guarantee complete bleeding of the brake system.

In the embodiment of FIG. 1, the structure for guiding and retaining the ball 24 consists of a cage with a perforated bottom 27, which is mounted in the bore 17 by means of an elastic retaining ring 28, the baffle-forming bottom of the cage 27 being located in the vicinity of the central projection 14 of the cover 7. In the embodiment according to FIG. 2, the slope-forming structure for retaining and guiding the ball 24 consists of a perforated tubular extension 27' of the central projection 14' of the cover 7' extending axially in the bore 17, a perforated partition 270 being attached in the tubular extension part 27' at the level of its connection to the central projection 14'. In the embodiment according to FIG. 3, the slope-forming structure for retaining and guiding the ball 24 consists of ribs 27" which extend radially inwards in the bore 17 of the tubular extension part 13 of the stepped piston 10 over a portion of the axial extension of the bore 17 adjacent to the seat 23, and of an attached perforated partition 270'. In all the embodiments, the shoulder 16 of the cover 7' forms a stop for the return of the stepped piston 10 into its position of rest (under the effect of the differential pressure exerted on these active surfaces) in interaction with the free end of the tubular extension part 13.

Although the present invention has been described with reference to particular embodiments, it is not limited to these, but is, on the contrary, capable of undergoing modifications and having alternative forms which will be apparent to a person skilled in the art.

We claim:

1. A brake-pressure corrector sensitive to deceleration and for the hydraulic brake system of a vehicle, comprising a body in which is located a stepped piston having a small diameter surface associated with an inlet chamber formed within the body and connected to a brake-pressure emitter, and a second large diameter surface associated with an outlet chamber formed in the body and connected to at least one brake motor, the inlet and outlet chambers communicating with one another by a passage formed coaxially in the stepped piston and provided on an inlet chamber side with a seat engageable with a deceleration sensitive, freely movable inertial shut-off member disposed within the body, characterized in that the inlet chamber is partially defined by a cover mounted in the body, the stepped piston having a tubular extension part extending toward the inlet chamber and which sealingly engages a central cover projection of reduced diameter which extends longitudinally within the body and defines, together with the tubular extension part of the stepped piston, the inlet chamber, the tubular extension part and central cover projection including therebetween a seal which provides the sealing engagement therebetween, the central cover projection connected to a body part of the cover by means of a radial shoulder which extends radially outwardly and forms a return stop for the stepped piston, the return stop engageable directly with an axial end of the tubular extension part of the stepped piston, and the corrector including a stop element disposed in the passage to engage the inertial shut-off member and remove the inertial shut-off member from the seat when the stepped piston moves a predetermined distance away from the cover.

2. The corrector according to claim 1, characterized in that the central cover projection provides a groove for the seal.

3. The corrector according to claim 1, characterized in that the inertial shut-off member is located within a guide and retention structure fixed to the stepped piston.

4. The corrector according to claim 1, characterized in that the inertial shut-off member is located within a guide and retention structure fixed to the central cover projection of the cover.

5. The corrector according to claim 1, characterized in that the stop element is a tubular member.

6. The corrector according to claim 1, characterized in that the seat comprises a ring of elastomeric material mounted on a tubular insert introduced into the passage of the stepped piston.

7. The corrector according to claim 1, characterized in that the body is cylindrical and includes, opposite the cover, an axial extension provided with means for connecting the outlet chamber with the brake motor.

* * * * *